United States Patent
Shin et al.

(10) Patent No.: US 9,760,276 B2
(45) Date of Patent: Sep. 12, 2017

(54) METHOD FOR DISABLING A LOCKING SCREEN BY USING OBJECT AND ELECTRONIC DEVICE USING THE METHOD

(71) Applicant: Samsung Electronics Co., Ltd., Gyeonggi-do (KR)

(72) Inventors: Kyu-Ho Shin, Gyeonggi-do (KR); Jae-Woo Seol, Seoul (KR); Sung-Keun Kim, Gyeonggi-do (KR); Geon-Soo Kim, Gyeonggi-do (KR); Jeong-Hyun Pang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 209 days.

(21) Appl. No.: 14/321,316

(22) Filed: Jul. 1, 2014

(65) Prior Publication Data
US 2015/0012859 A1 Jan. 8, 2015

(30) Foreign Application Priority Data
Jul. 5, 2013 (KR) .......... 10-2013-0079214

(51) Int. Cl.
*G06F 3/048* (2013.01)
*G06F 3/0488* (2013.01)
*G06F 3/0484* (2013.01)
*G06F 21/36* (2013.01)

(52) U.S. Cl.
CPC .......... *G06F 3/0488* (2013.01); *G06F 3/0484* (2013.01); *G06F 21/36* (2013.01)

(58) Field of Classification Search
None
See application file for complete search history.

(56) References Cited

U.S. PATENT DOCUMENTS

| | | | |
|---|---|---|---|
| 8,381,274 B2* | 2/2013 | Wang | G06F 21/36 726/19 |
| 8,638,939 B1* | 1/2014 | Casey | G06F 21/36 380/277 |
| 2004/0030934 A1* | 2/2004 | Mizoguchi | G06F 21/36 726/18 |
| 2009/0083847 A1 | 3/2009 | Fadell et al. | |
| 2009/0325661 A1 | 12/2009 | Gross | |
| 2010/0333197 A1 | 12/2010 | Wang | |

(Continued)

FOREIGN PATENT DOCUMENTS

EP    2 251 811    11/2010

OTHER PUBLICATIONS

European Search Report dated Mar. 3, 2016 issued in counterpart application No. 14174738.6-1972, 7 pages.

(Continued)

*Primary Examiner* — Thanh Vu
(74) *Attorney, Agent, or Firm* — The Farrell Law Firm, P.C.

(57) ABSTRACT

A method of disabling a locking screen of an electronic device is provided. The method includes selecting at least two objects among at least three objects each having a unique color, determining whether at least one of a color order and a rotation direction of the selected at least two objects matches a pre-set color order and a pre-set rotation direction, and disabling a locking screen upon determining the match with at least one of the pre-set color order and the pre-set rotation direction.

10 Claims, 10 Drawing Sheets

(56) References Cited

U.S. PATENT DOCUMENTS

2011/0258689 A1* 10/2011 Cohen .................. H04L 63/061
  726/7
2013/0080960 A1  3/2013 McRae et al.

OTHER PUBLICATIONS

European Search Report dated Dec. 13, 2016 issued in counterpart application No. 14174738.6-1972, 10 pages.
Summons to Attend Oral Proceedings dated Jul. 6, 2017 issued in counterpart application No. 14174738.6-1972, 13 pages.

* cited by examiner

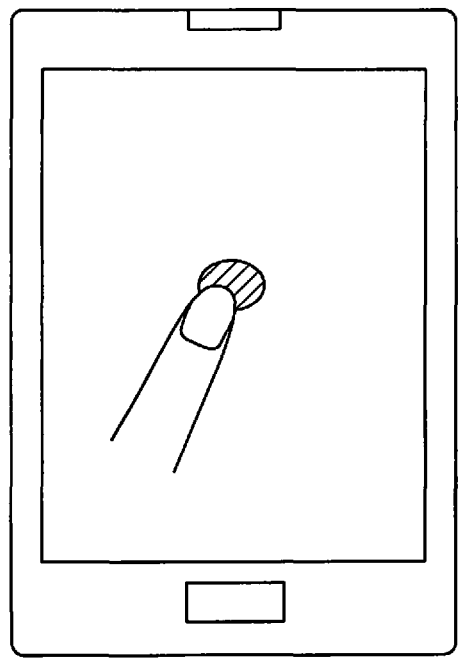
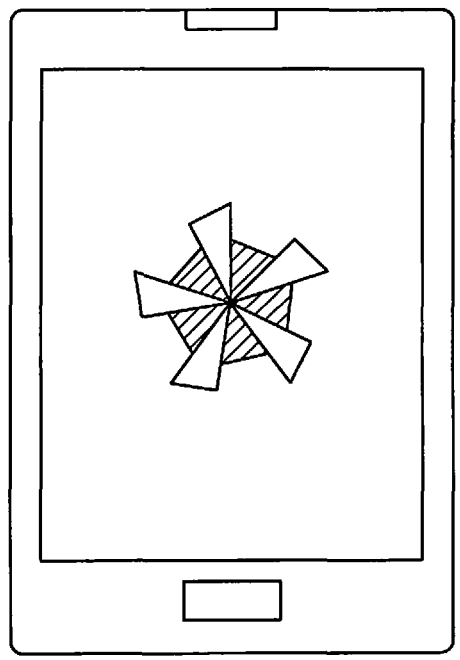
FIG.2A        FIG.2B
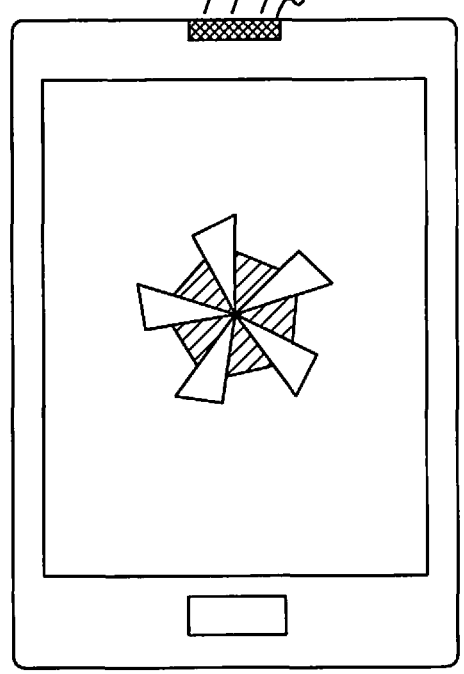
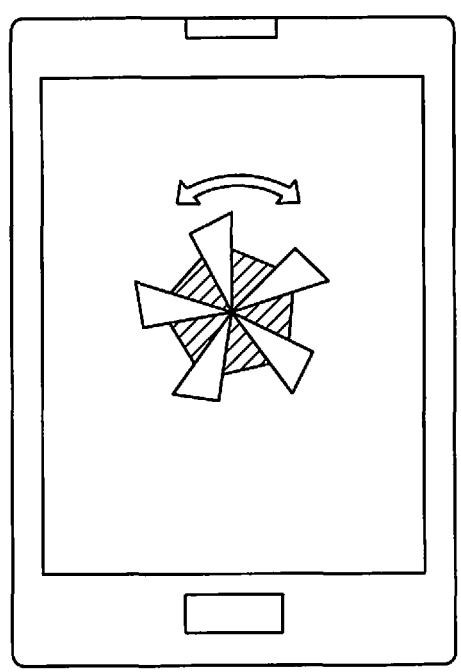
FIG.2C        FIG.2D

METHOD FOR DISABLING A LOCKING SCREEN BY USING OBJECT AND ELECTRONIC DEVICE USING THE METHOD

PRIORITY

This application claims priority under 35 U.S.C. §119(a) to a Korean Patent Application filed in the Korean Intellectual Property Office on Jul. 5, 2013 and assigned Serial No. 10-2013-0079214, the entire disclosure of which is incorporated herein by reference.

BACKGROUND OF THE INVENTION

1. Field of the Invention

The present invention generally relates to an electronic device for disabling locking using an object and a method thereof.

2. Description of the Related Art

Since an electronic device can store important data such as a large-capacity address book, business data, personal banking information, etc., it is important to lock the screen of the electronic device. Locking is enabled in the electronic device by a user to ensure security by using a password or pattern matching.

However, there is a problem in that security is weakened when locking is enabled using the conventional pattern matching. For example, a pattern can be easily recognized by an unauthorized person by just glancing at the screen while the user disables the locking of the electronic device, which is a violation of individual privacy.

Accordingly, there is an urgent need for a method for disabling locking to improve security while rapidly disabling the locking enabled in an electronic device.

SUMMARY OF THE INVENTION

An aspect of the present invention is to solve at least the above-mentioned problems and/or disadvantages and to provide at least the advantages described below. Accordingly, an aspect of the present invention is to provide an apparatus and method for allowing a user to experience a new aesthetic sense different from that of the conventional locking screen by using a rotatable object to disable locking.

Another aspect of the present invention is to provide an apparatus and method capable of improving user's security by preventing a pattern from being easily revealed, in such a manner that locking is disabled only when a color, a rotation direction, a rotation number, etc., of an object are matched.

In accordance with an aspect of the present invention, a method of operating an electronic device is provided. The method includes selecting at least two objects among at least three objects each having a unique color, determining whether at least any one of a color order and a rotation direction of the selected at least two objects matches a pre-set color order and a pre-set rotation direction, and disabling a locking screen upon determining a match exists with at least one of the pre-set color order and the pre-set rotation direction.

In accordance with another aspect of the present invention, a method of operating an electronic device is provided. The method includes displaying one object having a unique color in each of at least two pre-set areas, determining whether at least one of a color order of at least one area selected among the pre-set areas, a rotation direction of the object, and a rotation count of the object matches a pre-set color order, a pre-set rotation direction, and a pre-set rotation count, and disabling a locking screen upon determining a match exists with at least one of the pre-set color order, the pre-set rotation direction, and the pre-set rotation count.

In accordance with another aspect of the present invention, an electronic device is provided. The electronic device includes a touch screen for selecting at least two objects among at least three objects each having a unique color, and a processor for determining whether at least any one of a color order and a rotation direction of the selected at least two objects matches a pre-set color order and a pre-set rotation direction, and for disabling a locking screen upon determining a match exists with at least one of the pre-set color order and the pre-set rotation direction.

In accordance with another aspect of the present invention, an electronic device is provided. The electronic device includes a touch screen for displaying one object having a unique color in each of at least two pre-set areas, and a processor module for determining whether at least one of a color order of at least one area selected among the pre-set areas, a rotation direction of the object, and a rotation count of the object matches a pre-set color order, a pre-set rotation direction, and a pre-set rotation count, and for disabling a locking screen upon determining a match exists with at least one of the pre-set color order, the pre-set rotation direction, and the pre-set rotation count.

BRIEF DESCRIPTION OF THE DRAWINGS

The above and other aspects, features and advantages of certain embodiments of the present invention will be more apparent from the following detailed description taken in conjunction with the accompanying drawings, in which:

FIG. 2A, FIG. 2B, FIG. 2C and FIG. 2D illustrate a second lock disable function of an electronic device according to an embodiment of the present invention;

DETAILED DESCRIPTION OF EMBODIMENTS OF THE PRESENT INVENTION

Figure 1A:
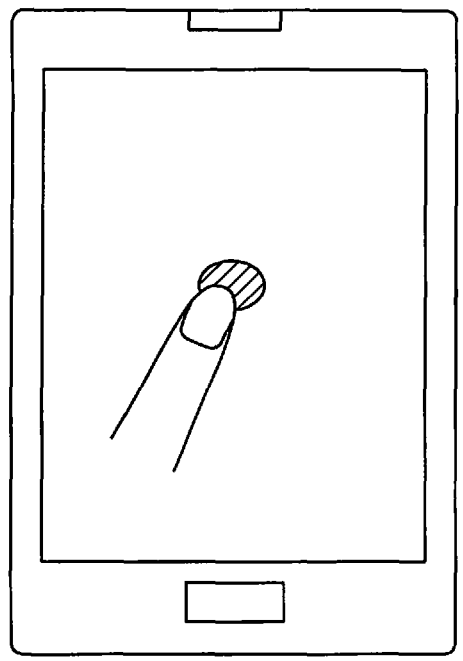
FIG. 1A, FIG. 1B, FIG. 1C and FIG. 1D illustrate a first lock disable function of an electronic device according to an embodiment of the present invention.

Embodiments of the present invention will be described herein below with reference to the accompanying drawings.

In the following description, well-known functions or constructions are not described in detail since they would obscure the invention in unnecessary detail. Also, the terms used herein are defined according to the functions of the present invention. Thus, the terms may vary depending on user's or operator's intention and usage. That is, the terms used herein must be understood based on the descriptions made herein. Further, like reference numerals denote parts performing similar functions and actions throughout the drawings.

FIG. 1A, FIG. 1B, FIG. 1C and FIG. 1D illustrate a first lock disable function of an electronic device according to a first embodiment of the present invention. As illustrated in FIG. 1A, the electronic device receives a touch input at any point of a touch screen of the electronic device to disable locking of a screen in which a first locking function is enabled. Herein, the first locking function may be a locking function which does not require security. More specifically, the first locking function may be a locking function which is enabled in an idle screen so that the electronic device can access a background from the idle screen. For example, if the first locking function is enabled in the electronic device, a user can disable the first locking function which is enabled in the electronic device, by pushing any icon displayed in the idle screen of the electronic device in a pre-set direction.

Figure 1B:
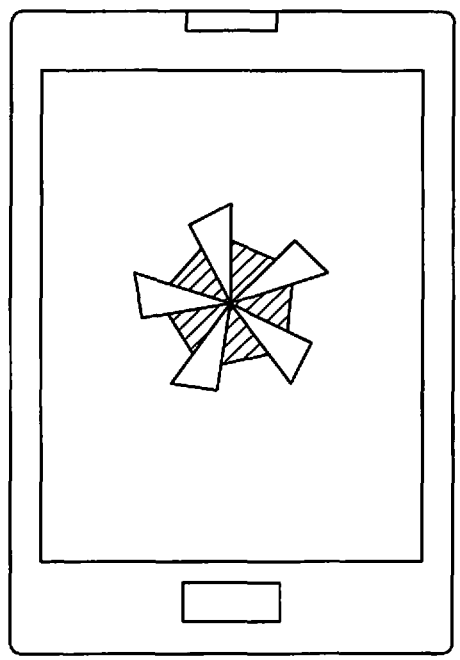

Thereafter, as illustrated in FIG. 1B, the electronic device displays a pre-set object in an area in which the touch input is made. Herein, the object may be rotatable in a selected direction. For example, when a touch input is made in any area and thereafter an operation of flicking in a clockwise or counter-clockwise direction is detected, the object rotates in the detected direction.

Although the object has a pinwheel shape in the present embodiment, various rotatable objects can be used irrespective of shapes. In addition, although it is described in the present embodiment that the electronic device displays a pre-set object when a touch input is made in any area, the electronic device can also display an initially pre-set object even if there is no touch input.

Figure 1C:
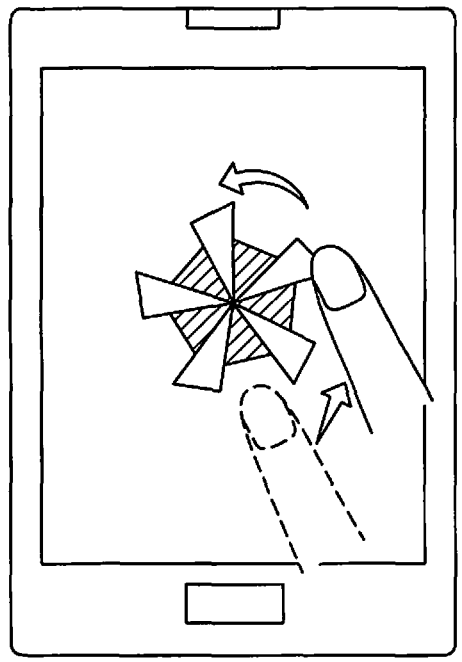
Figure 1D:
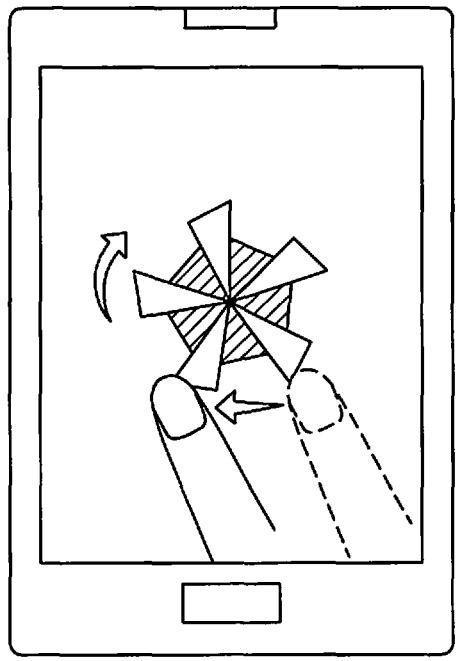

Thereafter, as illustrated in FIG. 1C and FIG. 1D, if the electronic device selects a pre-set object displayed in any area and the selected object rotates in a pre-set direction a pre-set number of times, the electronic device disables the enabled locking. More specifically, if the electronic device selects an object displayed in the touch screen of the electronic device and thereafter detects that the object rotates a pre-set number of times by receiving an input of a flick operation for rotating the selected object in a clockwise or counter-clockwise direction, the electronic device disables the locking which is enabled in the screen.

For example, it is assumed that locking is disabled in the electronic device if an object which is pre-set in the electronic device rotates three times. In the aforementioned assumption, the electronic device can disable the locking enabled in the screen if the electronic device detects an operation of flicking an object displayed in a touch screen of the electronic device in a clockwise direction and thereafter if it is determined that a pre-set number, i.e., 3 times, is satisfied.

FIG. 2A, FIG. 2B, FIG. 2C and FIG. 2D illustrate a first lock disable function of an electronic device according to a second embodiment of the present invention. As illustrated in FIG. 2A, the electronic device receives a touch input at any point of a touch screen of the electronic device to disable locking of a screen in which a first locking function is enabled. As described above, although it is described that the electronic device displays a pre-set object when a touch input is made in any area, the electronic device can also display an initially pre-set object even if there is no touch input.

Thereafter, as illustrated in FIG. 2B, the electronic device displays a pre-set object in an area in which the touch input is made. Although the object has a pinwheel shape herein, various rotatable objects may be used irrespective of shapes.

Thereafter, as illustrated in FIG. 2C, the electronic device determines whether a sound recognition unit 201 included in the electronic device detects a sound of which a volume is greater than or equal to a pre-set decibel. More specifically, the electronic device determines whether a sound detected from a microphone 201 included in the electronic device 201 has a volume greater than or equal to the pre-set decibel. For example, a user can blow into the microphone to simulate a wind blowing around the microphone 201 of the electronic device, so that the electronic device can detect a sound of which a volume is greater than or equal to the pre-set decibel, and simulates the wind blowing on the object to rotate the object. In the same sense, the electronic device automatically rotates the object in a pre-set direction upon detecting a wind greater than or equal to the pre-set decibel from the user without having to touch the object displayed in the electronic device in order to disable the first locking function.

Thereafter, as illustrated in FIG. 2D, if the electronic device detects a sound of which a volume is greater than or equal to a decibel pre-set in the microphone 201 included in the electronic device, the electronic device disables locking of a screen which is locked, by rotating the object displayed in the touch screen of the electronic device in a pre-set direction. For example, it is assumed that, upon detecting a sound of which a volume is greater than or equal to a decibel pre-set in the electronic device, a direction of rotating the object displayed in the touch screen of the electronic device is a clockwise direction. In the aforementioned assumption, if the electronic device detects the sound of which a volume is greater than or equal to a decibel which is pre-set in the microphone 201 included in the electronic device, the electronic device can disable the first locking function by automatically rotating the object displayed in the touch screen of the electronic device in the pre-set clockwise direction.

Conversely, if the first locking function is enabled in the conventional electronic device, the user of the electronic device must manually disable a screen which is locked, by inputting a specific button or the like selected by the user. That is, in order to disable a locking screen which is pre-set in the conventional electronic device, the user has to directly select a specific button displayed in the touch screen of the electronic device.

However, the electronic device according to the present invention has an advantage in that a locking screen which is locked can be disabled by automatically rotating an object displayed in the electronic device in a pre-set direction upon detecting a sound of which a volume is greater than or equal to a decibel which is pre-set from a user.

Figure 3A:
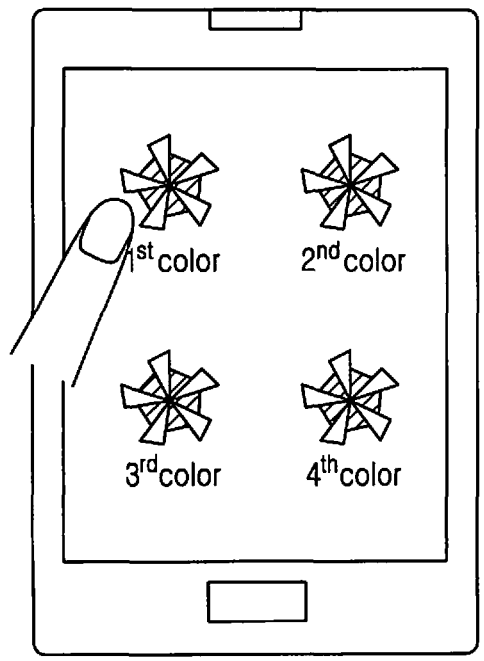
FIG. 3A, FIG. 3B, FIG. 3C and FIG. 3D illustrate a third lock disable function of an electronic device according to an embodiment of the present invention.
Figure 3B:
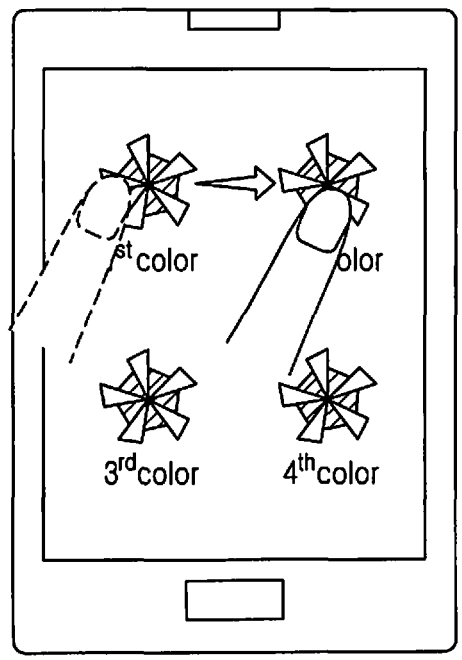
Figure 3C:
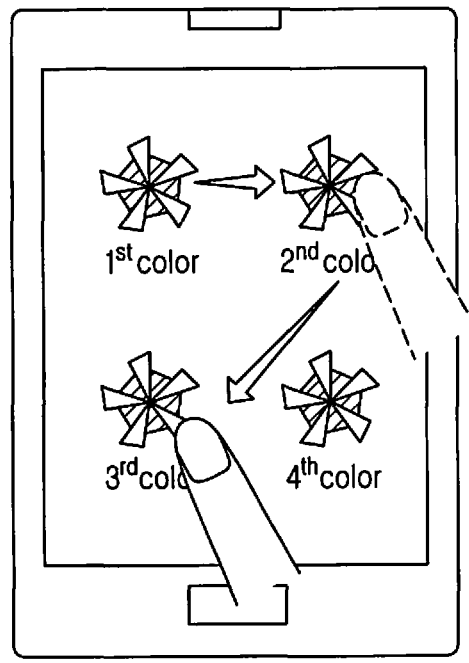
Figure 3D:
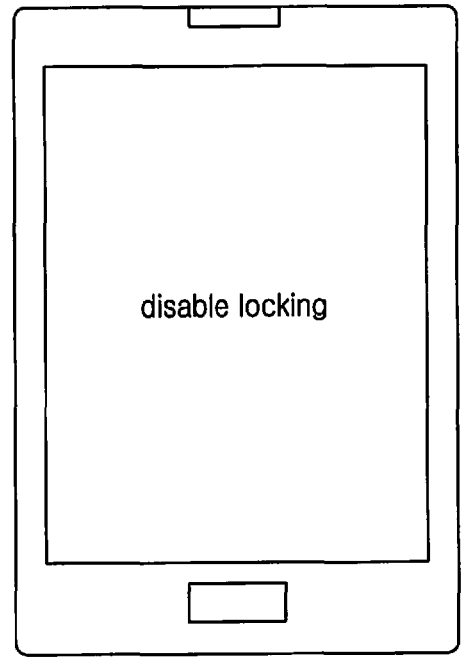

FIG. 3A, FIG. 3B, FIG. 3C and FIG. 3D illustrate a second lock disable function of an electronic device according to a first embodiment of the present invention. As illustrated in FIG. 3A, the electronic device receives a touch input at any point of a touch screen of the electronic device to disable locking of a screen in which a locking function is enabled. Herein, the locking function may be a locking function which requires security. More particularly, the second locking function may be a locking function which is enabled in an idle screen to access a background from the idle screen when a pre-set password, a pre-set pattern, etc., are input to the electronic device. In addition, each object displayed in the touch screen of the electronic device may have a unique color, and may be rotatable by a flick operation of a user. More specifically, the object of the present invention may have a unique color that can be distinguished from each other, and may be rotatable in a clockwise or a counter-clockwise direction. In addition, the electronic device may randomly display an arrangement order of the object when at least three objects are displayed.

Thereafter, at least two objects selected from the at least three displayed objects are input to the electronic device. More specifically, the electronic device repeats at least one time an operation of selecting an object having a $2^{nd}$ color when a drag trace starts in a state where an object having a $1^{st}$ color is selected from the at least three objects. For example, as illustrated in FIG. 3A to FIG. 3D, assume that the second locking function enabled in the electronic device is disabled when objects having a $1^{st}$ color to a $3^{rd}$ color are continuously selected. In the aforementioned assumption, the electronic device disables the screen locking in FIG. 3D, if the object having the $2^{nd}$ color is selected in FIG. 3B when a drag trace starts in a state where the first object having the $1^{st}$ color is selected in FIG. 3A and thereafter the object having the $3^{rd}$ color is selected in FIG. 3C by a continuous drag trace operation.

If the electronic device determines that the drag trace is not achieved according to a pre-set object color order, the electronic device can randomly rearrange at least three objects. In the aforementioned assumption, if the objects are not selected in the order of the object having the $1^{st}$ color to the object having the $3^{rd}$ color, the electronic device randomly rearranges again the object displayed first in the touch screen of the electronic device. Therefore, since the electronic device always randomly rearranges a position of a displayed object, security can be advantageously increased.

Figure 4A:
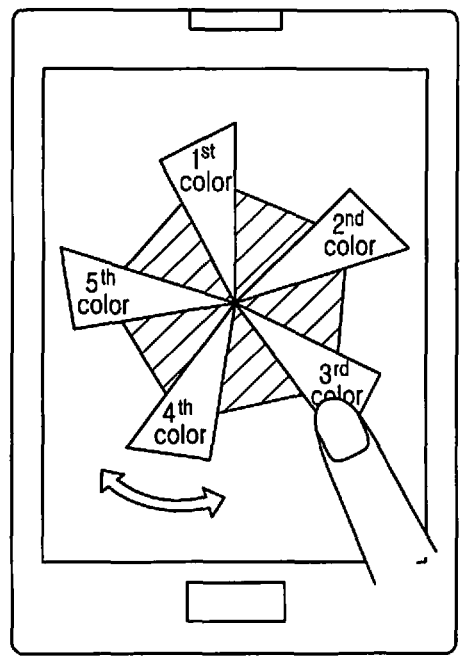
FIG. 4A, FIG. 4B, FIG. 4C and FIG. 4D illustrate a fourth lock disable function of an electronic device according to an embodiment of the present invention.
Figure 4B:
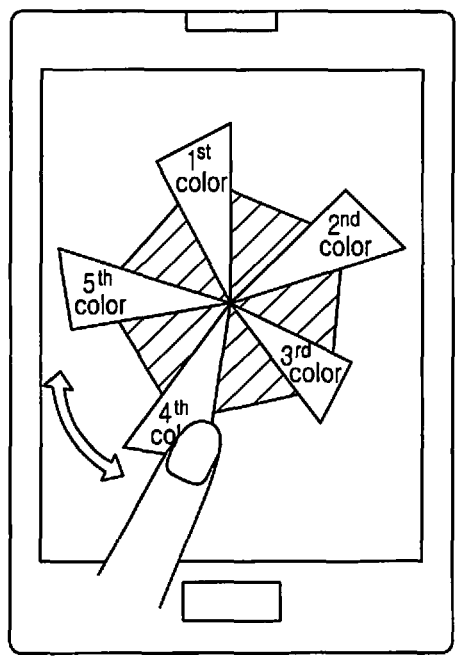
Figure 4C:
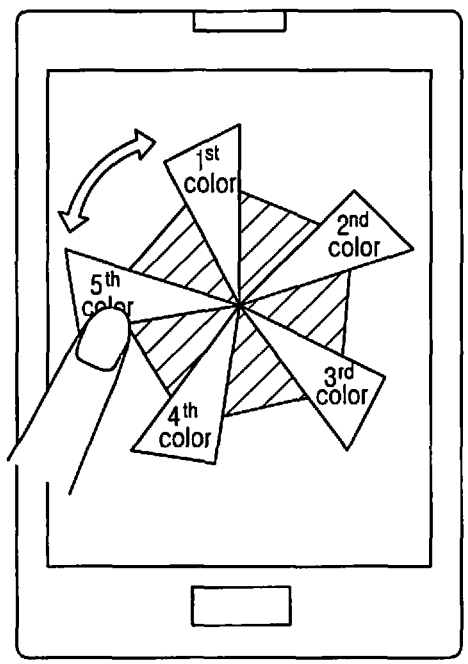

FIG. 4A, FIG. 4B, FIG. 4C and FIG. 4D illustrate a first lock disable function of an electronic device according to a third embodiment of the present invention. The electronic device displays one pre-set object in a pre-set area to receive an input for disabling the enabled second locking function. Herein, the object is rotatable, and may have a unique color in each of at least two pre-set areas. More specifically, the object may have at least two pre-set areas, and a color that can be distinguished from one area to another may be displayed in each pre-set area. For example, as illustrated in FIG. 4A to FIG. 4C, one object may have 5 pre-set areas, and $1^{st}$ to $5^{th}$ colors that can be distinguished from one another are displayed in the respective areas.

Thereafter, at least one area is selected from at least two pre-set areas displayed in the touch screen of the electronic device. More specifically, the electronic device detects an operation of flicking in a clockwise direction or a counter-clockwise direction in a state where a touch input is made on at least one area among the at least two pre-set areas displayed in the touch screen of the electronic device.

Figure 4D:
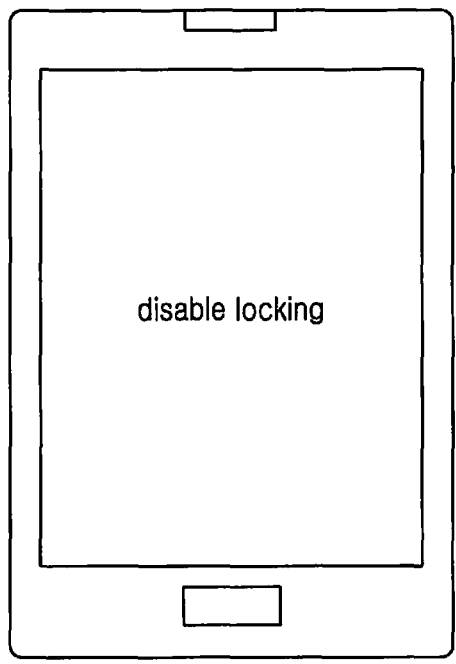
Figure 5A:
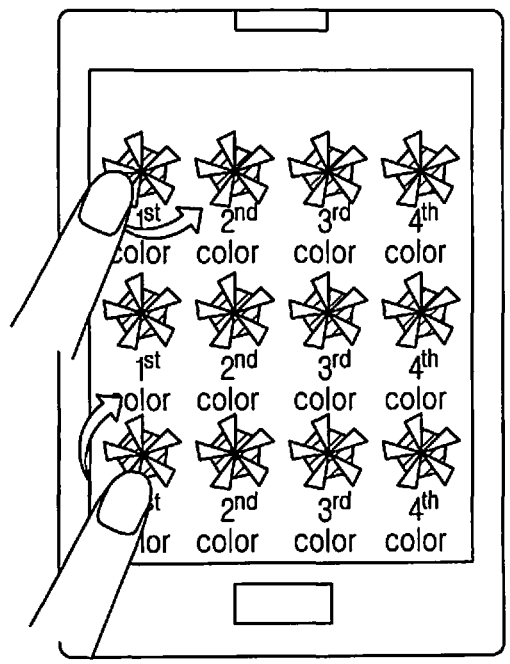
FIG. 5A, FIG. 5B, FIG. 5C and FIG. 5D illustrate a fifth lock disable function of an electronic device according to an embodiment of the present invention.
Figure 5B:
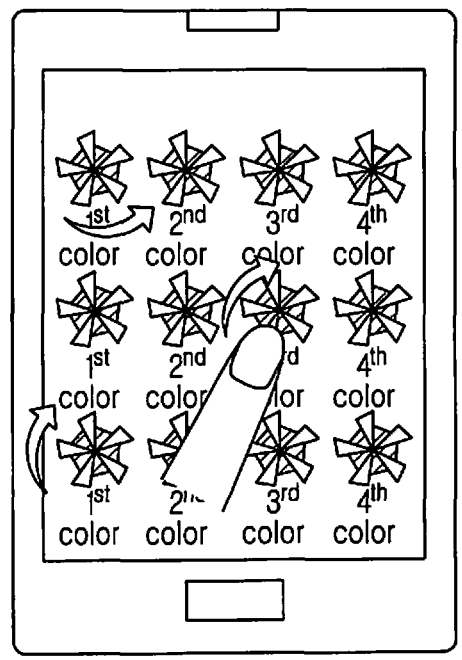
Figure 5C:
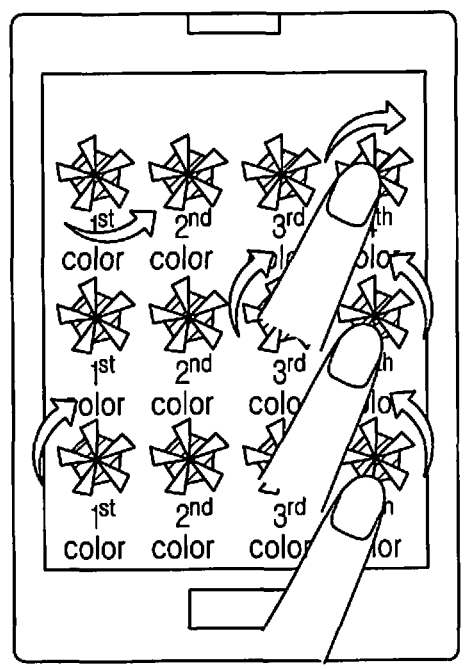
Figure 5D:
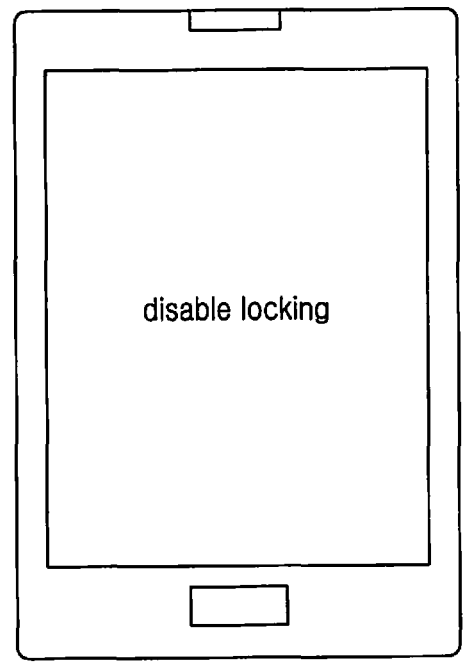

For example, as illustrated in FIG. 4A and FIG. 4D, assume that the electronic device can disable a second locking function upon detecting a rotation in any direction when an area indicated with a $3^{rd}$ color is selected in the electronic device. In the aforementioned assumption, the electronic device disables the enabled second locking function if the electronic device detects an operation of flicking in any direction in a state where the area indicated with the $3^{rd}$ color is selected in the electronic device among five areas included in the object. In the same sense, as illustrated in FIG. 4B to FIG. 4D, the electronic device disables the enabled second locking function if the electronic device detects an operation of flicking in any direction in a state where areas indicated with a $4^{th}$ color and a $5^{th}$ color are selected in the electronic device.

Although only a color displayed in a pre-set area of an object is considered in the aforementioned embodiment as a means for disabling the second locking function enabled in the electronic device, the electronic device may consider all of "a color and a rotation direction" and "a color, a rotation direction, and a rotation count".

If "the color and the rotation direction" of the object are considered as the means for disabling the second locking function enabled in the electronic device, the electronic device determines whether to disable the second locking function by considering a rotation direction in which the object rotates as well as a color displayed in a selected area among areas of the object. For example, assume that the electronic device can disable the second locking function if the electronic device detects a rotation in a clockwise direction upon selecting an area indicated with a $3^{rd}$ color. In the aforementioned assumption, the electronic device disables the second locking function if the electronic device detects an operation of flicking in a clockwise direction in a state where the area indicated with the $3^{rd}$ color is selected in the electronic device among five areas included in the object.

If "the color, the rotation direction, and the rotation count" of the object are considered as the means for disabling the second locking function enabled in the electronic device, the electronic device determines whether to disable the second locking function by considering a rotation count by which the object rotates as well as a color displayed in a selected area among areas of the object and a rotation direction in which the object rotates. For example, assume that the electronic device can disable the second locking function if the electronic device detects that a rotation is achieved four times in a counter-clockwise direction upon selecting an area indicated with a $4^{th}$ color. In the aforementioned assumption, the electronic device disables the enabled second locking function if the electronic device detects an operation of flicking in a counter-clockwise direction four times in a state where the area indicated with the $4^{th}$ color is selected in the electronic device among five areas included in the object.

FIG. 5A, FIG. 5B, FIG. 5C and FIG. 5D illustrate a second lock disable function of an electronic device according to a second embodiment of the present invention. The electronic device can display at least three pre-set objects in a pre-set area to receive an input for disabling the enabled second locking function. Thereafter, among at least three objects each having a unique color, at least two objects may be selected in the electronic device. More specifically, among at least three objects having $1^{st}$ to $3^{rd}$ colors, objects having the same color may not be selected or may be selected at least one time in any one of a clockwise direction and a counter-clockwise direction, and thereafter the electronic device may detect that the selected at least two objects rotate in selected rotation directions, respectively.

For example, as illustrated in FIG. 5A to FIG. 5D, assume that the electronic device can disable the second locking function if the electronic device detects a rotation in any direction when two objects having the $1^{st}$ color are selected, no object having the $2^{nd}$ color is selected, one object having the $3^{rd}$ color is selected, and three objects having the $4^{th}$ color are selected. In addition, also assume that the electronic device displays three objects each having the $1^{st}$ to $4^{th}$ colors in the touch screen of the electronic device.

In the aforementioned assumption, the electronic device detects a rotation in any direction after a touch input is made on first two objects having the $1^{st}$ color. Thereafter, if the electronic device detects a rotation in any direction when a touch input is made on one object having the $3^{rd}$ color and three objects having the $4^{th}$ color, the electronic device disables the enabled second locking function.

Although only a color and count of an object are considered in the aforementioned embodiment as a means for disabling the second locking function enabled in the electronic device, the electronic device may consider all of "the color, the rotation count, and the rotation direction".

If "the color, the rotation count, and the rotation direction" of the object are considered as the means for disabling the second locking function enabled in the electronic device, the electronic device can determine whether to disable the second locking function by considering a rotation direction in which the object rotates as well as the color of the object and the number of objects having the same color.

For example, assume that the electronic device can disable the second locking function when, upon selecting two objects having the $1^{st}$ color, the electronic device detects that a first object rotates in a counter-clockwise direction and a second object rotates in a clockwise direction, upon selecting one object having the $3^{rd}$ color without selecting the object having the $2^{nd}$ color, detects that the object rotates in the clockwise direction, and upon selecting three objects having the $4^{th}$ color, detects that a first object rotates in the clockwise direction and the remaining two objects rotate in the counter-clockwise direction.

In the aforementioned assumption, the electronic device disables the second locking function when, upon selecting two objects having the $1^{st}$ color, the electronic device detects that a first object rotates in a counter-clockwise direction and a second object rotates in a clockwise direction, upon selecting one object having the $3^{rd}$ color without selecting the object having the $2^{nd}$ color, detects that the object rotates in the clockwise direction, and upon selecting three objects having the $4^{th}$ color, detects that a first object rotates in the clockwise direction and the remaining two objects rotate in the counter-clockwise direction.

Figure 6:
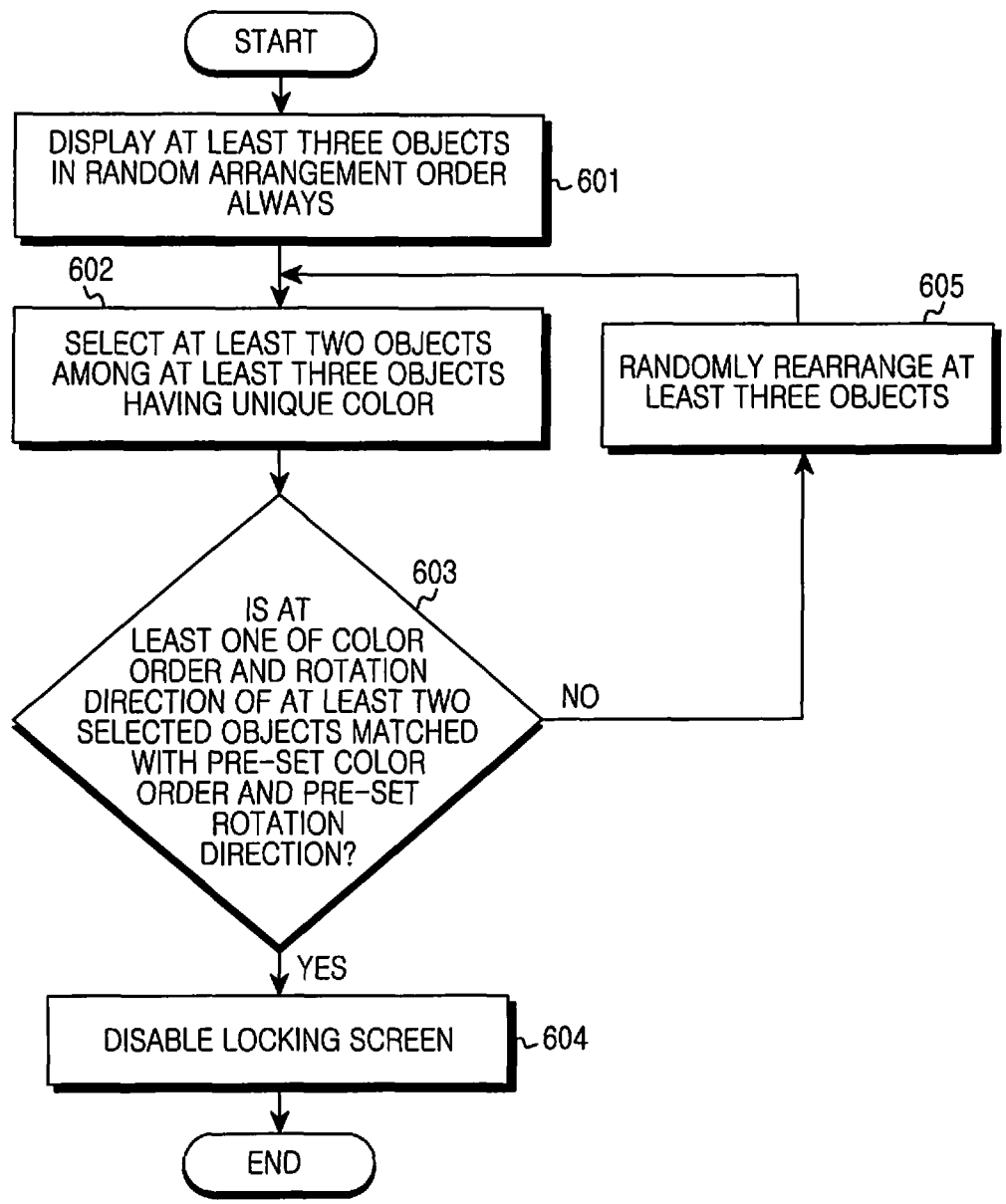
FIG. 6 is a flowchart illustrating an operational order of an electronic device for disabling an enabled locking function according to the present invention.

FIG. 6 is a flowchart illustrating an operational order of an electronic device for disabling an enabled second locking function according to the present invention. As illustrated in FIG. 6, the electronic device always displays at least three objects in a random arrangement order always in step 601. That is, the electronic device displays at least three objects in a touch screen of the electronic device in order to disable a locking screen in which the second locking function is enabled. Herein, the second locking function may be a locking function which requires security. More particularly, the second locking function may be a locking function which is enabled in an idle screen to access a background from the idle screen when a pre-set password, a pre-set pattern, etc., are input to the electronic device. In addition, each object displayed in the touch screen of the electronic device may have a unique color, and may be rotatable by a flick operation of a user. More specifically, each object may have a unique color that can be distinguished from each other, and may be rotatable in a clockwise or a counter-clockwise direction. In addition, the electronic device may randomly display an arrangement order of the object when at least three objects are displayed.

Thereafter, at least two objects selected from the at least three objects each having a unique color are input to the electronic device in step 602. For example, the electronic device repeats at least one time an operation of selecting an object having a $2^{nd}$ color when a drag trace starts in a state where an object having a $1^{st}$ color is selected from the at least three objects. For another example, the electronic device detects an operation of flicking in a clockwise direction or a counter-clockwise direction in a state where a touch input is made on at least one area among the at least two pre-set areas displayed in the touch screen of the electronic device. For another example, among at least three objects having $1^{st}$ to $3^{rd}$ colors, objects having the same color may not be selected or may be selected at least one time in any one of a clockwise direction and a counter-clockwise direction, and thereafter the electronic device detects that the selected at least two objects rotate in selected rotation directions, respectively.

Thereafter, the electronic device determines whether any one of a color order and a rotation direction of the selected at least two objects matches a pre-set color order and a pre-set rotation direction in step 603. For example, assume that the electronic device can disable the second locking function if the electronic device detects a rotation in any direction when two objects having the $1^{st}$ color are selected, no object having the $2^{nd}$ color is selected, one object having the $3^{rd}$ color is selected, and three objects having the $4^{th}$ color are selected. In addition, also assume that the electronic device displays three objects each having the $1^{st}$ to $4^{th}$ colors in the touch screen of the electronic device. In the aforementioned assumption, the electronic device detects whether a rotation is achieved in any direction after a touch input is made on first two objects having the $1^{st}$ color. Thereafter, the electronic device detects whether a rotation is achieved in any direction when a touch input is made on one object having the $3^{rd}$ color and three objects having the $4^{th}$ color.

If it is determined in step 603 that the electronic device determines that any one of the color order and the rotation direction of the selected at least two objects matches the pre-set color order and the pre-set rotation direction, the electronic device disables the enabled locking screen in step 604.

However, if it is determined in step 603 that the electronic device determines that any one of the color order and the rotation direction of the selected at least two objects does not match the pre-set color order and the pre-set rotation direction, the electronic device randomly rearranges at least three objects in step 605, and repeats step 602.

Figure 7:
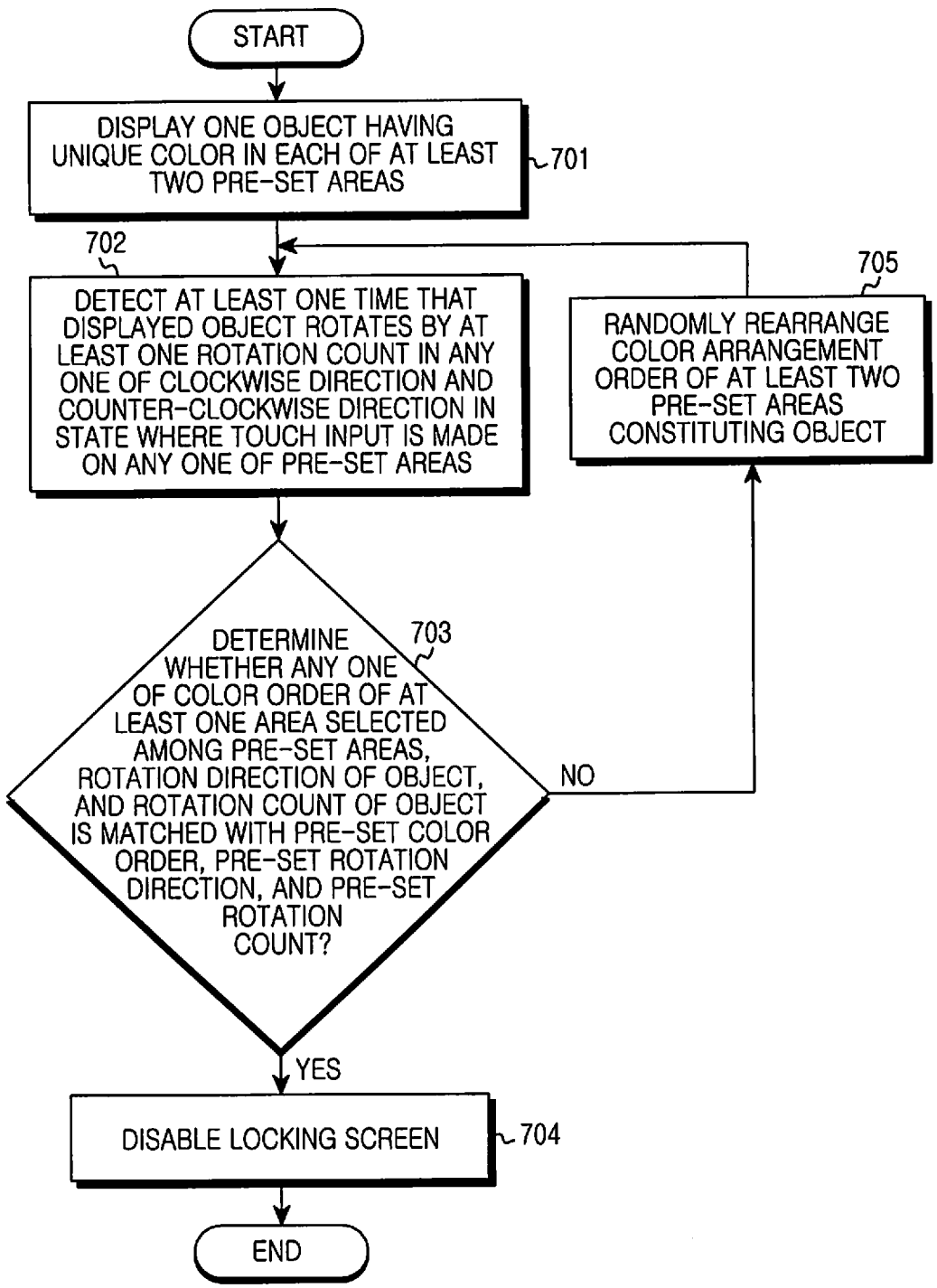
FIG. 7 is a flowchart illustrating an operational order of an electronic device for disabling an enabled locking function according to the present invention.

FIG. 7 is a flowchart illustrating an operational order of an electronic device for disabling an enabled first locking function according to the present invention. As illustrated in FIG. 7, the electronic device displays one object having a unique color in each of at least two pre-set areas in step 701. Herein, the object is rotatable, and has a unique color in each of at least two pre-set areas. More specifically, the object has at least two pre-set areas, and a color that can be distinguished from one area to another is displayed in each pre-set area. For example, one object may have 5 pre-set areas, and $1^{st}$ to $5^{th}$ colors that can be distinguished from one another are displayed in the respective areas.

Thereafter, the electronic device detects at least one time that the displayed object rotates by at least one rotation count in any one of a clockwise direction and a counter-clockwise direction in a state where a touch input is made on any one of pre-set areas in step 702. For example, assume that the electronic device can disable the second locking function if the electronic device detects that a rotation is achieved four times in the counter-clockwise direction upon selecting an area indicated with a $4^{th}$ color. In the aforementioned assumption, the electronic device determines whether an operation of flicking four times in the counter-clockwise direction is detected in a state where the area indicated with the $4^{th}$ color is selected among five areas included in the object.

Thereafter, the electronic device determines whether any one of a color order of at least one area selected among pre-set areas, a rotation direction of an object, and a rotation count of the object matches a pre-set color order, a pre-set rotation direction, and a pre-set rotation count in step 703. If it is determined in step 703 that the electronic device detects at least one time that the displayed object rotates by at least one rotation count in any one of the clockwise direction and the counter-clockwise direction in a state where the touch input is made on any one of pre-set areas, the electronic device disables the enabled locking screen in step 704.

Otherwise, if it is determined in step 703 that the electronic device does not detect at least one time that the displayed object rotates by at least one rotation count in any one of the clockwise direction and the counter-clockwise direction in a state where the touch input is made on any one of pre-set areas, the electronic device randomly rearranges a color arrangement order of at least two pre-set areas constituting the object in step 705, and repeats step 702.

Figure 8:
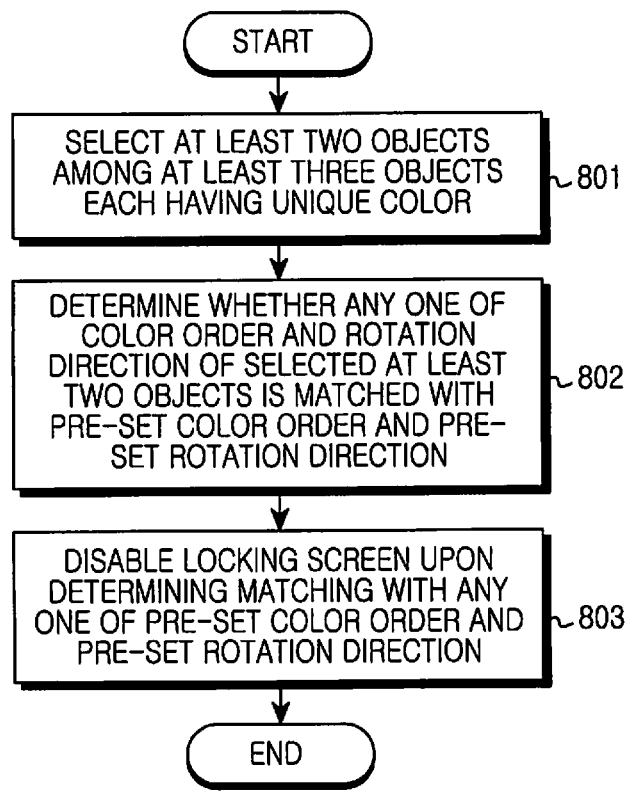
FIG. 8 is a flowchart illustrating a method of an electronic device for disabling a locking function by using an object according to an embodiment of the present invention.

FIG. 8 is a flowchart illustrating a method of an electronic device for disabling a second locking function by using an object according to an embodiment of the present invention. As illustrated in FIG. 8, among at least three objects each having a unique color, at least two objects may be selected in the electronic device in step 801. For example, the electronic device repeats at least one time an operation of selecting an object having a $2^{nd}$ color when a drag trace starts in a state where an object having a $1^{st}$ color is selected from the at least three objects. For another example, the electronic device detects an operation of flicking in a clockwise direction or a counter-clockwise direction in a state where a touch input is made on at least one area among the at least two pre-set areas displayed in the touch screen of the electronic device. For another example, among at least three objects having $1^{st}$ to $3^{rd}$ colors, objects having the same color may not be selected or may be selected at least one time in any one of a clockwise direction and a counter-clockwise direction, and thereafter the electronic device detects that the selected at least two objects rotate in selected rotation directions, respectively.

Thereafter, the electronic device determines whether any one of a color order and a rotation direction of the selected at least two objects matches a pre-set color order and a pre-set rotation direction in step 802. For example, assume that the electronic device can disable the second locking function if the electronic device detects a rotation in any direction when two objects having the $1^{st}$ color are selected, no object having the $2^{nd}$ color is selected, one object having the $3^{rd}$ color is selected, and three objects having the $4^{th}$ color are selected. In addition, also assume that the electronic device displays three objects each having the $1^{st}$ to $4^{th}$ colors in the touch screen of the electronic device. In the aforementioned assumption, the electronic device detects whether a rotation is achieved in any direction after a touch input is made on first two objects having the $1^{st}$ color. Thereafter, the electronic device detects whether a rotation is achieved in any direction when a touch input is made on one object having the $3^{rd}$ color and three objects having the $4^{th}$ color.

Thereafter, the electronic device disables the locking screen upon determining that any one of the pre-set color order and the pre-set rotation direction matches in step 803.

Figure 9:
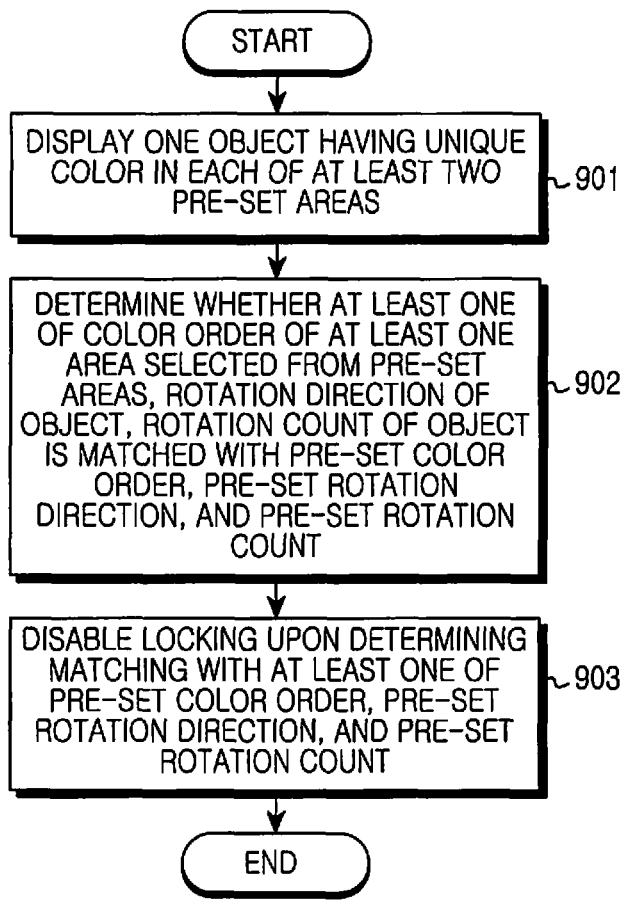
FIG. 9 is a flowchart illustrating a method, of an electronic device for disabling a locking function by using an object according to an embodiment of the present invention.

FIG. 9 is a flowchart illustrating a method of an electronic device for disabling a first locking function by using an object according to an embodiment of the present invention. As illustrated in FIG. 9, the electronic device displays one object having a unique color in each of at least two pre-set areas in step 901. Herein, the object is rotatable, and has a unique color in each of at least two pre-set areas. More specifically, the object has at least two pre-set areas, and a color that can be distinguished from one area to another is displayed in each pre-set area. For example, one object may have 5 pre-set areas, and $1^{st}$ to $5^{th}$ colors that can be distinguished from one another may be displayed in the respective areas.

Thereafter, the electronic device determines whether at least one of a color order of at least one area selected from pre-set areas, a rotation direction of an object, a rotation count of the object matches with a pre-set color order, a pre-set rotation direction, and a pre-set rotation count in step 902. For example, assume that, if the electronic device detects that a rotation is achieved four times in a counter-clockwise direction upon selecting an area indicated with a $4^{th}$ color, the electronic device disables the second locking function. In the aforementioned assumption, the electronic device determines whether an operation of flicking is detected in a counter-clockwise direction four times in a state where an area indicated with the $4^{th}$ color is selected in the electronic device.

Thereafter, the electronic device disables locking upon determining that at least one of the pre-set color order, the pre-set rotation direction, and the pre-set rotation count are matched in step 903. Since the object's color, rotation direction, rotation count, etc., must be matched in order to disable locking in the electronic device of the present invention, a pattern is not easily revealed and thus there is an advantage in that user's security can be improved.

Figure 10:
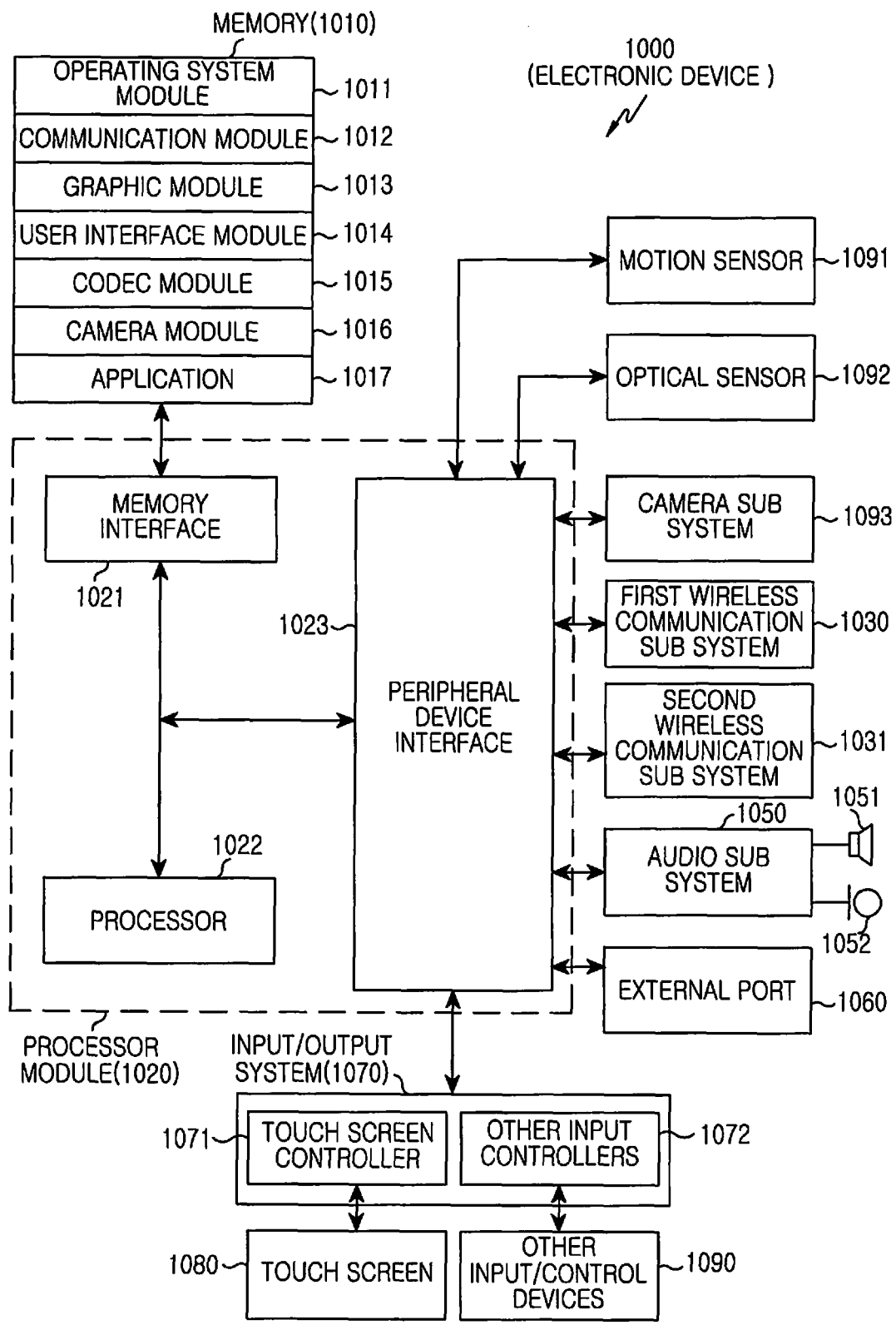
FIG. 10 is a block diagram illustrating a structure of an electronic device according to an embodiment of the present invention.

FIG. 10 is a block diagram illustrating a structure of an electronic device according to an embodiment of the present invention. Such an electronic device 1000 may be a portable electronic device, and may be a device such as a portable terminal, a mobile phone, a mobile pad, a media player, a tablet computer, a handheld computer, or a Personal Digital Assistant (PDA). In addition, the electronic device may be any portable electronic device including a device which combines two or more functions among these devices.

The electronic device 1000 includes a memory 1010, a processor module 1020, a first wireless communication subsystem 1030, a second wireless communication subsystem 1031, an external port 1060, an audio subsystem 1050, a speaker 1051, a microphone 1052, an Input Output (IO) system 1070, a touch screen 1080, and an extra input or control device 1090. The memory 1010 and the external port 1060 may be plural in number.

The processor module 1020 may include a memory interface 1021, one or more processors 1022, and a peripheral interface 1023. Occasionally, the entire processor module 1020 may be referred to as a processor. In the present invention, the processor module 1020 determines whether at least one of a color order and a rotation direction of selected at least two objects matches a pre-set color order and a pre-set rotation direction, and if matching with any one of the pre-set color order and the pre-set rotation direction is determined, disables a locking screen. In addition, the processor module 1022 detects whether the selected at least two objects rotate in a rotation direction at a time when each of the objects is selected. In addition, the processor module 1022 detects whether each of the selected at least two objects rotates in the selected rotation direction, and randomly rearranges the at least three objects if mismatching with the pre-set color order and the pre-set rotation direction is determined. In addition, the processor module 1020 determines whether at least one of a color order of at least one area selected among the pre-set areas, a rotation direction of the object, and a rotation count of the object matches a pre-set color order, a pre-set rotation direction, and a pre-set rotation count, and releases a locking screen if matching with at least one of the pre-set color order, the pre-set rotation direction, and the pre-set rotation count is determined. In addition, the processor module 1202 detects whether the displayed object rotates in the pre-set rotation direction upon detecting a sound of which a volume is greater than or equal to a pre-set decibel. In addition, the processor module 1202 detects at least one time that the displayed object rotates by at least one rotation count in any one of a clockwise direction and a counter-clockwise direction in a state where a touch input is made on any one of the pre-set areas. In addition, the processor module 1202 randomly rearranges a color arrangement order of at least two pre-set areas constituting the object if mismatching with the at least one of the pre-set color order and the pre-set rotation direction is determined.

The processor 1022 performs various functions for the electronic device 1000 by executing a variety of software programs, and processes and controls voice communication and data communication. In addition to such a typical function, the processor 1022 executes a specific software module (i.e., an instruction set) stored in the memory 1010 and thus performs various specific functions corresponding to the module. That is, the processor 1022 performs the method of the embodiment of the present invention by synchronizing with software modules stored in the memory 1010.

The processor 1022 may include one or more data processors, an image processor, or a COder/DECoder (CODEC). The data processor, the image processor, or the CODEC can be configured separately. In addition, these elements can be configured as several processors each of which performs a different function. The peripheral interface 1023 connects various peripheral devices of the electronic device 1000 to the processor 1022 and the memory 1010 (via the memory interface).

The external port 1060 is used to directly connect a portable electronic device (not shown) to another electronic device, or indirectly connects it to another electronic device through a network (e.g., Internet, intranet, wireless Local Area Network (LAN), etc.). For example, although not limited thereto, the external port 1060 refers to a Universal Serial Bus (USB) port or a FIREWIRE port.

A motion sensor 1091 and an optical sensor 1092 may be connected to the peripheral device interface 1023 to enable several functions. For example, the motion sensor 1091 and the optical sensor 1092 may be connected to the peripheral device interface 1023 to detect a motion of the electronic device or to detect an external light beam. In addition, other sensors such as a positioning system, a temperature sensor, a bio sensor, etc., may be connected to the peripheral device interface 1023 to perform related functions.

A camera subsystem 1093 can perform a camera function such as capturing, video clip recoding, etc.

The optical sensor 1092 can use a Charge Coupled Device (CCD) device or a Complementary Metal-Oxide-Semiconductor (CMOS) device.

One or more wireless communication subsystems 1030 and 1031 are used to perform a communication function. The wireless communication subsystems 1030 and 1031 may include a radio frequency receiver and transceiver and/or an optical (e.g., infrared ray) receiver and transceiver. The first communication subsystem 1030 and the second communication subsystem 1031 may be identified according to a communication network through which the electronic device 1000 communicates. For example, the communication network is not limited thereto, and the subsystem may include a communication subsystem designed to operate through a Global System for Mobile Communication (GSM) network, an Enhanced Data GSM Environment (EDGE) network, a Code Division Multiple Access (CDMA) network, a W-Code Division Multiple Access (W-CDMA) network, a Long Term Evolution (LTE) network, an Orthogonal Frequency Division Multiple Access (OFDMA) network, a Wireless Fidelity (Wi-Fi) network, a WiMax network, and/or a Bluetooth network. The first wireless communication subsystem 1030 and the second wireless communication subsystem 1031 may be combined into one wireless communication subsystem.

The audio subsystem 1050 is coupled to the speaker 1051 and the microphone 1052, and performs an input and output of an audio stream such as voice recognition, voice recording, digital recording, telephony, etc. That is, the audio subsystem 1050 communicates with the user via the speaker 1051 and the microphone 1052. The audio subsystem 1050 receives a data stream via the peripheral interface 1023 of the processor unit 1020, and converts the received data stream into an electric stream. A converted electric signal is delivered to the speaker 1051. The speaker 1051 converts the electric stream into an audible sound wave, and outputs the electric stream. The microphone 1052 converts the sound wave delivered from a user or other different sound sources into an electronic stream. The audio subsystem 1050 receives the converted electronic stream from the microphone 1052. The audio subsystem 1050 converts the received electric stream into an audio data stream, and transmits the converted audio data stream to the peripheral interface 1023. The audio subsystem 1050 may include an attachable and detachable ear phone, headphone, or head set.

The I/O subsystem 1070 includes a touch screen controller 1071 and/or an extra input controller 1072. The touch screen controller 1071 is coupled to the touch screen 1080. Although not limited thereto, the touch screen 1080 and the touch screen controller 1071 can use not only capacitance, resistance, infrared and surface sound wave techniques for determining one or more contact points but also any multi-touch sense technique including other proximity sensor arrays or other elements to detect a contact, a movement, or stopping thereof. The extra input controller 1072 may be coupled to extra input/control devices 1090. The extra input/control devices 1090 may be one or more buttons, a rocker, a switch, a thumb-wheel, a dial, a stick, and/or a pointer device such as a stylus.

The touch screen 1080 provides an input/output interface between the electronic device 1000 and the user. That is, the touch screen 1080 delivers a touch input of the user to the electronic device 1000. In addition, the touch screen 1080 is a medium which shows to the user an output from the electronic device 1000. That is, the touch screen 1080 shows a visual output to the user. Such a visual output is represented in the form of a text, a graphic, a video, and a combination thereof.

A variety of displays can be used as the touch screen 1080. For example, although not limited thereto, the touch screen 1080 may include a Liquid Crystal Display (LCD), a Light Emitting Diode (LED), a Light Emitting Polymer Display (LPD), an Organic Light Emitting Diode (OLED), an Active Matrix Organic Light Emitting Diode (AMOLED), or a Flexible LED (FLED). In the present invention, the touch screen 1080 is used to select at least two objects among at least three objects each having a unique color. In addition, the touch screen 1080 always randomly displays an arrangement order of the at least three objects, and is used to select at least two objects among the at least three objects to rotate in any one of a clockwise direction and a counter-clockwise direction. In addition, the touch screen 1080 repeats at least one time an operation of selecting an object having a $2^{nd}$ color by starting a drag trace in a state where an object having a $1^{st}$ color is selected among the at least three objects. In addition, the touch screen 1080 displays at least three objects consisting of a $1^{st}$ color to a $3^{rd}$ color, and may not select the same-colored object among the displayed objects or select one time the object in any one of a clockwise direction and a counter-clockwise direction. In addition, the touch screen 1080 may display one object having a unique color in each of at least two pre-set areas, and always randomly displays a color arrangement order in each of the at least two pre-set areas.

The memory 1010 may be coupled to the memory interface 1021. The memory 1010 may include a fast random access memory such as one or more magnetic disc storage devices and/or a non-volatile memory, one or more optical storage devices, and/or a flash memory (e.g., NAND, NOR).

The memory 1010 stores a software component. The software component may include an Operating System (OS) module 1011, a communication module 1012, a graphic module 1013, a User Interface (UI) module 1014, a Moving Picture Experts Group (MPEG) module (or CODEC module) 1015, a camera module 1016, one or more application modules 1017, etc. It is noted that a module which is a software component may be expressed as a set of instructions. Thus, the module may be referred to as an "instruction set" or a "program".

The operating system program 1011 (e.g., a built-in operating system such as WINDOWS, LINUX, Darwin, RTXC, UNIX, OS X, or VxWorks) includes various software components for controlling a general system operation, which includes, for example, memory management and control, storage hardware (device) control and management, power control and management, etc. The operating system software performs a function for facilitating communication between various hardware components (devices) and software components (programs).

The communication module 1012 enables communication with other electronic devices such as a computer, a server, and/or a portable terminal via the wireless communication subsystems 1030 and 1031 or the external port 1060.

The graphic module 1013 includes various software components for providing and displaying graphics on the touch screen 1080. The term "graphics" indicates a text, a web page, an icon, a digital image, a video, an animation, etc.

The user interface module 1014 includes various software components related to a user interface. The user interface software module includes content related to how a state of the user interface changes and in which condition the state of the user interface changes.

The CODEC module 1015 includes software components related to encoding and decoding of a video file. The CODEC module may include a video stream module such as an MPEG module and/or an H.204 module. In addition, the CODEC module may include a CODEC module for several audio files, such as AAA, AMR, WMA, etc., and may further include an instruction set corresponding to the method of implementing the present invention.

The camera module 1016 includes a camera-related software component which enables camera-related processes and functions.

The application module 1017 includes a browser, e-mail, instant message, word processing, keyboard emulation, an address book, a touch list, a widget, Digital Rights Management (DRM), voice recognition, voice reproduction, a location determining function, a location-based service, etc.

In addition, various functions of the electronic device of the present invention, described above and to be described below, can be performed by using one or more stream processors and/or a hardware component including an Application Specific Integrated Circuit (ASIC) and/or a software component and/or a combination thereof.

While the present invention has been particularly shown and described with reference to certain embodiments thereof, it will be understood by those skilled in the art that various changes in form and details may be made therein without departing from the spirit and scope of the present invention as defined by the appended claims.

What is claimed is:

1. A method in an electronic device, the method comprising:
    selecting at least two objects on a locking screen of the electronic device, the locking screen comprising a plurality of objects arranged in a plurality of rows and columns, each of the rows comprising at least three objects each having a different color, and a plurality of objects included in each column having a same color;
    determining whether a color order of the selected at least two objects and a count of objects selected among the plurality of objects having the same color match a pre-set color order and a pre-set count of objects having the same color; and
    un-locking the locking screen of the electronic device upon determining the match with the pre-set color order and the pre-set count of objects having the same color.

2. The method of claim 1, wherein the at least three objects are arranged randomly when the locking screen is displayed.

3. The method of claim 1, wherein selecting the at least two objects further comprises:
    detecting that each of the selected at least two objects rotates in any one of a clockwise direction and a counter-clockwise direction; and
    determining a rotation direction of the each of the selected at least two objects,
    wherein determining whether the color order of the selected at least two objects and the count of objects having a same color match a pre-set color order and a pre-set count of objects having the same color comprises:
    determining whether the rotation direction of the each of the selected at least two object is matched with a pre-set rotation direction, respectively, and
    wherein un-locking the locking screen comprises:
    un-locking the locking screen upon determining the match with the pre-set color order, the pre-set count of objects having the same color, and the pre-set rotation direction.

4. The method of claim 1, wherein selecting the at least two objects comprises detecting a selection of the at least two objects via a drag trace.

5. The method of claim 1, further comprising randomly rearranging the at least three objects upon determining a match does not exist with the pre-set color order and the pre-set count of objects having the same color.

6. An electronic device comprising:
a touch screen for displaying a locking screen and selecting at least two objects on the locking screen, the locking screen comprising a plurality of objects arranged in a plurality of rows and columns, each of the rows comprising at least three objects each having a different color, and a plurality of objects included in each column having a same color; and
a processor for determining whether a color order of the selected at least two objects and a count of objects selected among the plurality of objects having the same color of the selected at least two objects matches a pre-set color order and a pre-set count of objects having the same color, and for un-locking the locking screen upon determining the match with the pre-set color order and the pre-set count of objects having the same color.

7. The electronic device of claim 6, wherein the touch screen displays the at least three objects randomly when the locking screen is displayed.

8. The electronic device of claim 6, wherein the processor detects that each of the selected at least two objects rotates in any one of a clockwise direction and a counter-clockwise direction, determines a rotation direction of the each of the selected at least two objects, determines whether the rotation direction of the each of the selected at least two object is matched with a pre-set rotation direction, respectively, and un-locks the locking screen upon determining the match with the pre-set color order, the pre-set count of objects having the same color, and the pre-set rotation direction.

9. The electronic device of claim 6, wherein the touch screen detects a selection of the at least two objects via a drag trace.

10. The electronic device of claim 6, wherein the processor randomly rearranges the at least three objects upon determining a match does not exist with the pre-set color order and the pre-set count of objects having the same color.

* * * * *